United States Patent [19]

Sandvik

[11] 4,307,870

[45] Dec. 29, 1981

[54] CLUTCH MECHANISM FOR HOISTING APPARATUSES

[75] Inventor: Johannes Sandvik, Stokke, Norway

[73] Assignee: Elkem A/S, Oslo, Norway

[21] Appl. No.: 196,386

[22] Filed: Oct. 14, 1980

Related U.S. Application Data

[63] Continuation-in-part of Ser. No. 139,246, Apr. 11, 1980.

[51] Int. Cl.[3] .......................... B66D 1/14; F16D 11/04

[52] U.S. Cl. .................................. 254/368; 192/93 A

[58] Field of Search ............... 254/346, 350, 351, 365, 254/368, 378, 299, 304, 317; 192/93 A, 92, 93 R, 66; 242/218, 220

[56] References Cited

U.S. PATENT DOCUMENTS

| | | | |
|---|---|---|---|
| 1,335,639 | 3/1920 | Bays | 254/346 |
| 1,551,072 | 8/1925 | Stein | 192/93 A X |
| 2,771,977 | 11/1956 | Wher | 192/66 X |
| 2,813,609 | 11/1957 | Spencer | 192/93 A |
| 3,841,453 | 10/1974 | Culbertson | 192/93 A |

*Primary Examiner*—Billy S. Taylor
*Attorney, Agent, or Firm*—Eyre, Mann, Lucas & Just

[57] ABSTRACT

The drum of a hoisting apparatus is axially shifted to frictionally engage a driving plate. The drum is shifted by rotating an adjacent, first disc about the drum axis relative to a coaxial stationary disc. Each of the discs has three holes of a particular configuration to define three cooperative pairs of holes. Each cooperative pair of holes receives a dowel of predetermined length so that rotation of the first disc causes the dowel to react against the discs and shift the first disc and drum away from the stationary disc and into frictional driving engagement with the driving plate.

9 Claims, 3 Drawing Figures

CLUTCH MECHANISM FOR HOISTING APPARATUSES

This application is a Continuation-in-Part of application Ser. No. 139,246 filed Apr. 11, 1980.

The present invention relates to a clutch mechanism for hoisting apparatuses. It is particularly useful with cranes, winches, shifting crabs and the like.

Clutches are, of course, very well known in the art. They normally comprise two coaxially mounted plates which are urged into engagement under spring pressure and disengaged by cam action.

In accordance with the present invention there is disclosed a positively activated clutch mechanism which does not rely on spring pressure for actuation. The clutch mechanism is characterized by its reliability and simplicity, the combination of which give quick and safe operation.

In accordance with the applicant's invention, two coaxially mounted discs are employed. Each disc has at least three holes therein on the face which faces the other disc. The holes are characterized by being elongated with at least a portion of the sidewall being essentially oblique to the surface of the disc and in the opposed sidewall being preferably substantially perpendicular to the surface of the disc.

Preferably each of the holes form an oblong recess with downwardly decreasing cross-sectional area ending in a generally spherically concave portion of predetermined radius of curvature. The perpendicular sidewall is also preferable a semi-cylindrical sidewall with predetermined radius of curvature and the axis of the semi-cylindrical portion being parallel to the axis of rotation of the disc.

The holes of each of the opposed discs are juxtaposed in opposition to one another and a dowel or such like is disposed in each pair of opposing holes.

The dowel preferably has rounded ends which ends are generally hemispherical having a radius of curvature corresponding to that of the generally spherical concave portion of the bottom of the holes. The rounded ends of the dowel rest in the corresponding bottoms of the opposing holes. The radius of a cross section of the dowel may be less than the radius of curvature of the perpendicular semi-cylindrical sidewall, however, it is preferable that the radius of each dowel be such as to provide a close fit against the perpendicular sidewall of the hole.

In the non-activated position the dowel lies along the oblique sidewalls of the opposed holes. When it is desired to activate the clutch mechanism, one of the discs is rotated with respect to the other to move the dowel from the oblique sidewalls to the perpendicular sidewalls. Since the dowels have a length which is less than or equal to the combined lengths of the oblique sidewalls but greater than the combined length of the perpendicular sidewalls, the dowels will cause positive separation of the two disc elements when they are moved from the oblique sidewalls to the perpendicular sidewalls. This motion can, in turn, be transferred to a drum which has a plate which bears against a moving clutch plate when the clutch mechanism is in the engaged position. Counter-rotation of the two discs returns the dowels to their original position against the oblique sidewalls thereby disengaging the clutch plate from the drum plate.

In order to limit the rotation between the two discs, a positive stop may be introduced to prevent over travel. According to the invention, however, over travel is preferably prevented by the close fit of the dowel against the perpendicular sidewalls of the opposing holes when the two discs are separated.

These and other aspects of the present invention may be more fully understood with reference to the drawings wherein.

Figure 1:
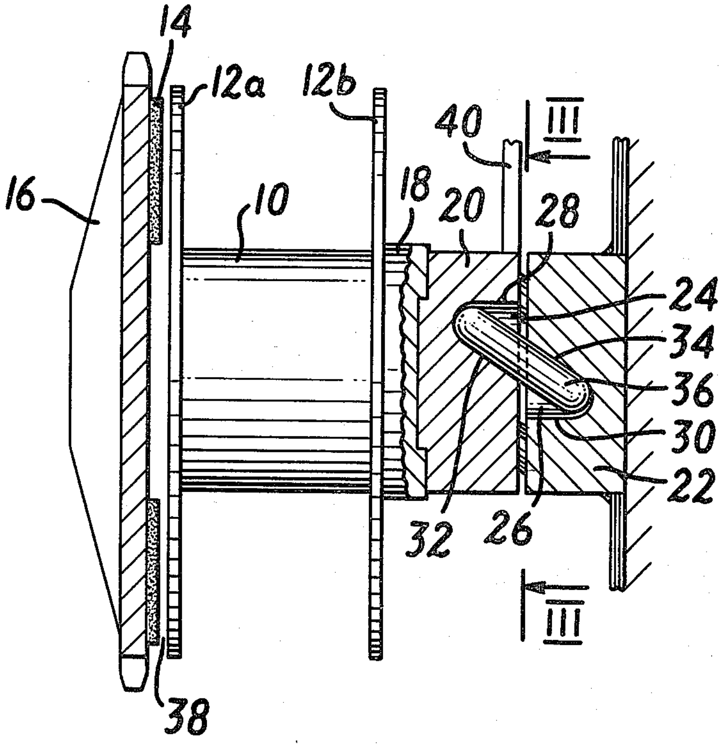
FIG. 1 is a schematic view of the clutch mechanism according to the present invention in a disengaged position.

Referring first to FIG. 1, there is shown a drum 10 having side plates 12*a* and 12*b*. Wire cables or the like may suitable be wound on the drum. Side plate 12*a* is translatable towards and away from engagement with drive plate 14 affixed to driven chain wheel 16, the drive mechanism not being shown.

Abutting against the outside of plate 12*b* is a bearing 18 (details not shown) to permit free rotation of the drum 10 with respect to discs 20 and 22 of the clutch actuation mechanism. While discs 20 and 22 are preferably circular, they need not be. Disc 22 is axially fixed while disc 20 is axially moveable toward and away from chain wheel 16. Components 10, 18, 20 and 22 are coaxially mounted on a spindle (not shown).

Discs 20 and 22 are provided with holes 24 and 26, respectively. In conjunction with FIG. 3, it can be seen that these holes have sidewalls 28 and 30 respectively, which are formed as generally semi-cylindrical portions having an axis of symmetry generally perpendicular to the opposed faces of the disc and sidewalls 32 and 34 respectively which are oblique to the opposed faces of the discs. The angle which the oblique sidewall makes with respect to the surface is not critical but is suitably at most about 80°. Each hole is a generally oblong slot having downwardly decreasing cross-sectional area ending in a generally spherical concave portion.

Figure 3:
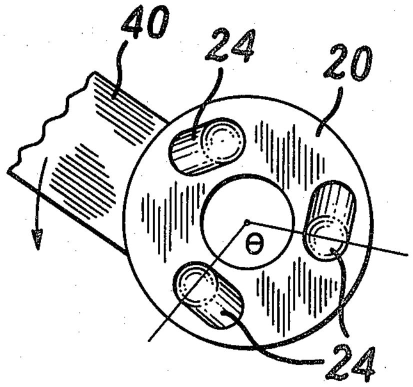
FIG. 3 is a front view of one of the discs making up the clutch mechanism showing the holes therein.

As can be seen in FIG. 3, the holes are aligned on the disc 20 so that the opposed oblique and perpendicular sidewalls of each hole intersect an arc concentric with the axis of the disc. However, it will be appreciated that all holes need not intersect the same arc. Furthermore it can be seen that all oblique sidewalls are aligned in the same direction on one disc and it will be appreciated that they are aligned in the opposite direction on the other disc.

As shown especially in FIG. 3, there are employed at least three holes in each disc. More may be employed if desired but three has been found to be the preferable number.

The holes are preferably substantially equidistantly spaced. While this is not absolutely necessary, the radial angular distance $\theta$ from the center line of one hole to the center line of the next adjacent hole in either direction should never exceed about 170° and should be about 150° or less.

Positioned in each of the holes is a dowel 36. Each dowel has a length which is greater than the length of the opposed perpendicular sidewalls 28 and 30. Furthermore, the distance 38 between the outside of the plate 12*a* and the facing side of drive plate 14 is less than the distance by which the length of the dowel exceeds the length of the two perpendicular sidewalls of the holes.

The upper limit of the length of the dowel is not critical. However, for practical reasons it should not be substantially greater (e.g. no more than about 25%) than the combined length of the opposed oblique sidewalls 32 and 34, and it is preferably equal to or less than that combined length.

Figure 2:
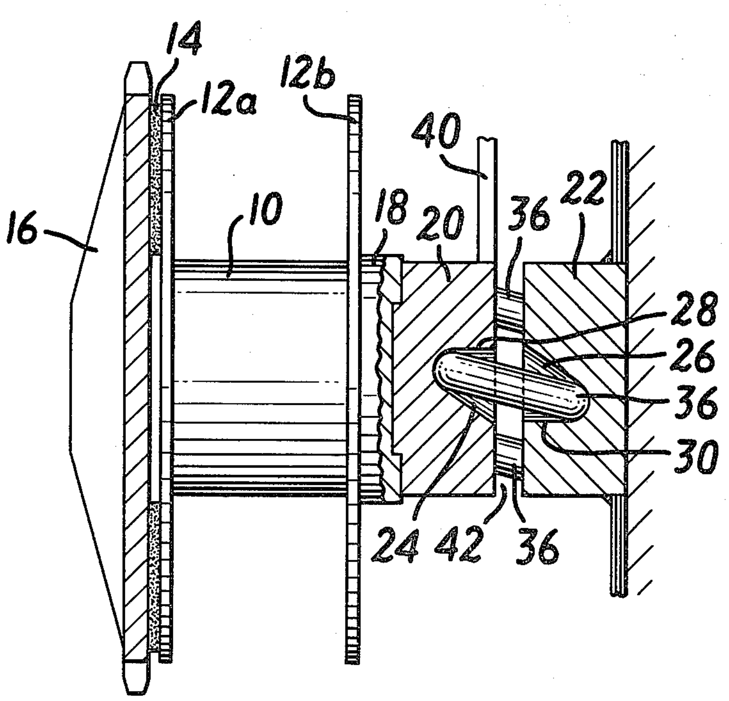
FIG. 2 is a clutch mechanism according to the present invention in an engaged position.

FIG. 2 shows the device of FIG. 1 in the engaged position. Disc 20 has been rotated with respect to disc 22. This can suitably be accomplished by arm 40 which may be manually operated or may be connected through appropriate linkage to a drive mechanism (not shown). As the disc 20 rotates the sidewalls of the dowels are moved from the oblique sidewalls of the holes towards the perpendicular sidewalls of the holes. This positively moves the plate 20 and thus the drum 10 axially moves towards the chain wheel 16 and drive plate 14 and this motion continues until plate 12*a* of drum 10 engages drive plate 14. As can be seen, a substantial gap 42 exists between the opposed faces of discs 20 and 22 in the engaged position.

Further rotation of the disc 20 past the deadpoint (i.e. where the dowels are parallel to the axis of rotation) can be prevented by a stop (not shown) to inhibit further movement of arm 40. Additionally, according to the invention, further rotation is prevented by the novel relationship of the dowels and holes as shown in the figures. The rounded ends of the dowels 36 conform substantially to the bottom portion of the holes 24 and 26. The radius of the cylindrical portion of each dowel 36 also closely conform to the radius of curvature of the perpendicular sidewalls 28 and 30 of the corresponding holes. Thus when the dowels abut the perpendicular sidewalls 28 and 30, they are essentially captured by the semi-cylindrical sidewalls and prevent the disc 20 from rotating past this point.

As can be seen especially in FIG. 3, the direction of the holes makes a small angle with respect to an imaginary line through the hole perpendicular to the radius. That is, the axis of symmetry of each of the holes lies at a small angle with respect to a tangent of a radial line through the axis of symmetry of the semi-cylindrical sidewall of the hole.

Counter-rotation of the discs 20 and 22 will again shorten the effective length of the dowels 36 as they approach the oblique sidewalls 32 and 34. This will in turn disengage the plate 12*a* of the drum 10 from the drive plate 14.

Preferably, the direction of rotation of disc 20 required to bring the drum 10 in contact with chain wheel 16 should be opposite the direction of rotation of the chain wheel 16. Accordingly then, the friction of the system will cause the disc 20 to automatically return to the disengaged position when the arm 40 is released.

It will be understood that the claims are intended to cover all changes and modifications of the preferred embodiments of the invention herein chosen for the purpose of illustration, which do not constitute departures from the spirit and scope of the invention.

What is claimed is:

1. Clutch mechanism for hoisting apparatuses comprising:
(a) a driven plate;
(b) a drum having opposed end plates, one said end plate being moveable into and out of engagement with said driven plate;
(c) a first disc having one side acting upon the other said end plate of said drum;
(d) the other side of said first disc having a generally planar surface;
(e) a second disc, said second disc having a generally planar surface which faces the planar surface of the first disc;
(f) at least three holes in the planar surface of each said disc, each said hole in the planar surface of said first disc opposing one hole of said second disc to form opposed pairs;
(g) each said at least three holes having one sidewall which is substantially perpendicular with respect to the planar surface and a second opposed sidewall oblique to the planar surface;
(h) a dowel in each said opposed pair of holes, said dowel having a length greater than the combined lengths of the perpendicular sidewalls of the opposed pair of holes;
(i) said discs having a first position wherein the dowels are positioned towards oblique walls of the holes and a second position wherein the opposed dowels are positioned towards the perpendicular walls of the holes;
(j) said discs being movable from said first position to said second position by relative rotation thereof;
(k) said one said end plate of said drum being in positive engagement with said driven plate when said discs are in said first position; and
(l) said one said end plate being out of positive engagement with said driven plate when said discs are in said second position.

2. The clutch mechanism of claim 1 wherein the perpendicular sidewall of each hole is a semi-cylindrical concave section having its cylindrical axis parallel to the axis of rotation of the disc.

3. The clutch mechanism of claim 2 wherein the dowels have round end portions and the bottom portions of each said hole are concave portions substantially conforming to the shaped of said rounded end portions.

4. The clutch mechanism of claim 3 wherein said rounded end portions are hemispherical end portions.

5. The clutch mechanism of claim 2 wherein the axis of symmetry of the hole makes a small angle with respect to a line perpendicular to a radial line of said disc through said cylindrical axis.

6. The clutch mechanism of claim 1 wherein there are three holes, the centers of which are radially spaced from the adjacent hole by no more than about 150°.

7. The clutch mechanism of claim 1 wherein the length of each dowel is not substantially greater than the combined length of the oblique sidewalls of the opposed pair of holes in which the dowel is situated.

8. The clutch mechanism of claim 1 wherein a bearing is disposed between the said one side of the said first disc and the said other said end plate of the said drum.

9. The clutch mechanism of claim 1 wherein the direction of said relative rotation from said first position to said second position is unidirectional with the direction of rotation of said driven plate.

* * * * *